US006454341B2

(12) United States Patent  
Tolinski (10) Patent No.: US 6,454,341 B2
(45) Date of Patent: Sep. 24, 2002

(54) LIFT GATE FOR A MOTOR VEHICLE (75) Inventor: Roch J. Tolinski, Howell, MI (US)

(73) Assignee: Meritor Light Vehicle Systems, Inc., Troy, MI (US)

(*) Notice: Subject to any disclaimer, the term of this patent is extended or adjusted under 35 U.S.C. 154(b) by 0 days.

(21) Appl. No.: 09/883,568

(22) Filed: Jun. 18, 2001

Related U.S. Application Data (60) Provisional application No. 60/212,753, filed on Jun. 20, 2000.

(51) Int. Cl.[7] ............................................... B62D 25/06
(52) U.S. Cl. ...................... 296/106; 296/186.8; 296/56
(58) Field of Search .............................. 296/106, 146.8, 296/56, 146.4, 146.13, 55; 49/352, 502

(56) References Cited

U.S. PATENT DOCUMENTS

| 3,612,601 | A | * | 10/1971 | Himka et al. ................ 296/106 |
| 3,713,472 | A | * | 1/1973 | Dozois ...................... 296/146.8 |
| 3,716,945 | A | * | 2/1973 | Cooper et al. ................. 296/56 |
| 3,749,440 | A | * | 7/1973 | Lathers ........................ 296/106 |
| 4,413,854 | A | * | 11/1983 | Hirshberg ................. 296/146.8 |
| 4,688,844 | A | * | 8/1987 | Hirose et al. ............... 296/106 |
| 4,818,009 | A | * | 4/1989 | Muscat ........................ 296/106 |
| 5,531,498 | A | * | 7/1996 | Kowall ..................... 296/146.8 |
| 5,806,917 | A | * | 9/1998 | Townsend ................. 296/146.9 |
| 5,921,611 | A | * | 7/1999 | Townsend ................... 296/106 |
| 5,960,519 | A | * | 10/1999 | Thompson et al. ............ 49/386 |
| 6,007,139 | A | * | 12/1999 | Shave ...................... 296/146.8 |
| 6,068,327 | A | * | 5/2000 | Junginger ................... 296/106 |
| 6,234,564 | B1 | * | 5/2001 | Kim ........................ 296/146.8 |
| 6,318,782 | B1 | * | 11/2001 | Suzuki et al. ............... 296/106 |
| 2001/0020793 | A1 | * | 9/2001 | Eberle ........................ 296/108 |
| 2002/0005650 | A1 | * | 1/2002 | Rogers et al. ................ 296/56 |
| 2002/0038963 | A1 | * | 4/2002 | Moon ......................... 296/106 |

FOREIGN PATENT DOCUMENTS

GB          2188595 A   *   4/1986

* cited by examiner

Primary Examiner—Kiran Patel
(74) Attorney, Agent, or Firm—Carlson Gaskey & Olds (57) ABSTRACT

A lift gate assembly for a vehicle includes a windowpane slidable between an open and a closed position within the lift gate along guide channels. A motor and drive cable move the windowpane between open and closed positions. Another embodiment the lift gate includes upper and lower sections pivotally connected to each other. The lift gate opens by folding the lower section upward relative to the upper section. Guide pins engage a guide track to hold the lift gate in intermediate open positions and also move completely free from the guide track to fully open the lift gate. In another embodiment the upper and lower sections of the lift gate are pivotally attached to the vehicle such that the upper lift gate opens upward, and the lower section opens downward. The windowpane slides open into the lower section along guide channels disposed within both sections of the lift gate.

18 Claims, 6 Drawing Sheets

LIFT GATE FOR A MOTOR VEHICLE

This application claims priority to U.S. provisional application Ser. No. 60/212,753 filed on Jun. 20, 2000.

BACKGROUND OF THE INVENTION

This invention relates to a lift gate for a vehicle having a window movable between open and closed positions.

Typically, a vehicle having a lift gate includes a window to allow an operator to view objects to the rear of the vehicle. The lift gate is pivotally attached to the vehicle to pivot upward and allow access to the interior of the vehicle. Typically, the widow in the lift gate may not be opened such that any access through the rear of the vehicle requires fully opening the lift gate. Fully opening the rear lift gate is not always desirable such as when small items need to be quickly stored. Further, there may be instances when there simply is not sufficient room behind the vehicle to pivot the large lift gate open. A typical improvement is to pivotally mount the rear window such that the window may pivot open independent of the lift gate. This type of configuration is problematic in that an opened window may be vulnerable to breaking.

For these reasons, it is desirable to develop a lift gate assembly including a window that can be opened to allow for easy and convenient access to the vehicle interior, while safeguarding the window against breakage.

SUMMARY OF THE INVENTION

The invention is a lift gate assembly movable between open and closed positions and including a windowpane movable to an open position by sliding into the lift gate assembly.

The assembly includes a lift gate for a vehicle pivotally attached at a topmost portion of the vehicle. The lift gate pivots upwardly from a closed position to an open position. A windowpane is mounted within a guide channel of the lift gate such that the windowpane may slide downwardly into the lift gate to an open position. A motor disposed within the vehicle includes a drive cable attached to drive the window between open and closed positions. The guide channel includes a pivoting mechanism that pivots the windowpane outward against a seal assembly disposed within the opening of the lift gate.

Another embodiment of the lift gate assembly includes upper and lower sections. The upper section includes a windowpane mounted within a guide channel. The upper section includes a pivotal connection to the vehicle and a pivotal connection to the lower section. Through the pivotal connection with the upper section, the lower section pivots relative to the upper section. The lower section includes a retaining mechanism that engages a track disposed on opposite sides of the lift gate. The retaining mechanism includes pins that engage opening in the track to hold the lift gate in any of a plurality of intermediate open positions.

In another embodiment, the lift gate assembly includes upper section and lower sections pivotally connected to the vehicle such that the upper section pivots open upward and the lower section pivots open downward. The upper section includes a windowpane slidable mounted within guide channels. The upper and lower sections include separate guide channels that align with one another to form a continuous channel in which the windowpane may slide downward into the lower section.

The subject invention provides a lift gate that can be opened in a smaller spaces than conventional lift gates and that includes a movable windowpane for access to the vehicle interior that does not require space to the rear of the vehicle and that further prevents exposure of the windowpane to damage.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1A:
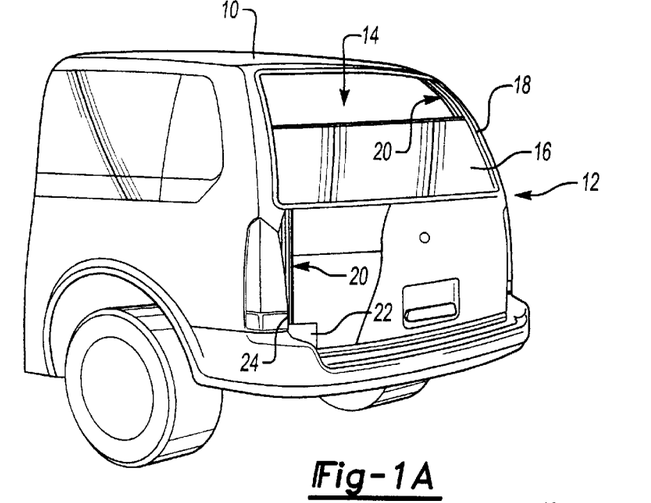
FIGS. 1A–C are perspective views of a lift gate with a movable windowpane shown in various positions.
Figure 1B:
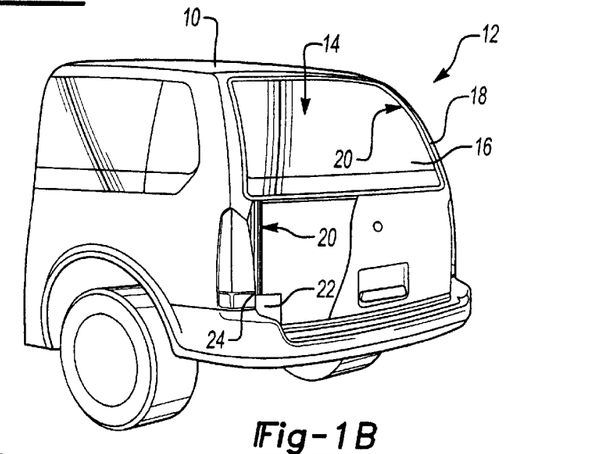
Figure 1C:
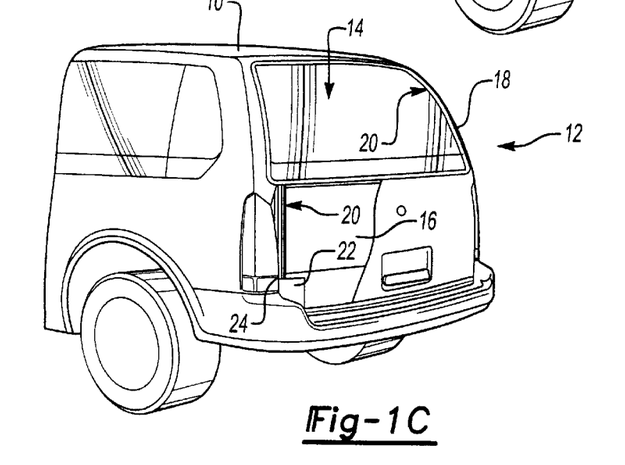

Referring to the FIGS., wherein like numerals indicate like or corresponding parts throughout the several views, the subject invention is a lift gate assembly for a vehicle generally shown at 10 in FIGS. 1A–C. The lift gate assembly includes a lift gate 12 with an opening 14. Within the opening 14 is a windowpane 16 that is slidably mounted within the lift gate 12. The opening 14 includes a seal assembly 18 to seal between the lift gate 12 and the windowpane 16.

The windowpane 16 is mounted within the lift gate 12 by a track system 20. The track system 20 guides the windowpane 16 between the open and the closed position. Preferably the track system 20 provides for inward movement of the windowpane during closing of the lift gate 12 such that the windowpane 16 can be fit tightly against the seal assembly 18 when in the closed position and is pulled away from the seal assembly 18 during opening of the window in such a manner as to facilitate movement of the windowpane 16 into the interior of the lift gate 12. A motor 22 disposed in the lift gate 12 drives the widow pane 16 between open and closed positions. The mechanism for driving the windowpane 16 between open and closed may be essentially identical to that utilized in controlling the movement for a moon roof. Preferably the motor 22 drives the widow pane 16 through flexible cables 24, however any drive mechanism know by a worker skilled in the art would be suitable for use with this invention. The connection of the cables is shown somewhat schematically, but a worker in this art would recognize how to provide the cable drive.

Referring to FIG. 1C, the windowpane 16 is shown in the completely open position. In this position access to the interior of the vehicle is provided through the opening 14 even though the lift gate 12 is closed. This provides for access to the interior of the vehicle 10 when space constraints do not allow for the opening of the lift gate 12.

Referring to FIGS. 2A–D, another embodiment of a lift gate 30 is shown including an upper section 32 and a lower section 34. The upper section 32 of the lift gate includes a pivotal connection 36 disposed substantially at the top of the vehicle 10. A strut assembly 38 is included to maintain the open position of the upper section 32. The strut assembly 38 is pivotally attached at one end to the vehicle 10 and to the upper section 32 of the lift gate 30 at a second end.

The lower section 32 of the lift gate 30 includes a pivotal connection 40 to the upper section 32 to allow the lower section 34 to pivot relative to the upper section 32. A strut assembly 42 is pivotally attached at one end to the upper section 32 and at an opposite end to the lower section 32. The strut assembly 42 assists in opening the lift gate 30 and in maintaining the lift gate 30 in intermediate opening positions.

The lower section 32 of the lift gate 30 also includes a retaining mechanism 44. Preferably the retaining mechanism 44 includes pins 46 extending outwardly from opposing sides of the lift gate 30. The pins 46 are biased outwardly to engage a guide track 48 disposed on laterally opposing sides of the vehicle 10. The retaining mechanism 44 includes a handle 50 that rotates to release the outward bias of the pins 46 such that the lift gate 30 can slide along the guide track 48. Although the connection of the handle to the pins is not shown, a worker in this art would know how to provide an appropriate mechanical connection. The lower section 34 pivots about the pins 46 such that opening of the lift gate 30 occurs by lifting and pivoting the lower section 34 outward from the vehicle 10 which in turn causes the upper section 32 to pivot about the pivotal connection 36 at the top of the vehicle 10 because of the second pivotal connection 40 between the upper and lower sections 32,34. In other words, pulling on the handle 50 pulls outward the pivotal connection 40 between the upper and lower sections 32,34, which in turn pulls the lower section 34 upward within the guide track 48 to fold toward the upper section 32.

Closing the lift gate 30 is accomplished by pushing on the handle 50 to drive the lower section 34 downward and the pivotal connection 40 inward toward the vehicle 10. To fully open the lift gate 30, the pins 46 are fully released from the guide track to free the lower section 34 from the guide track 48. The pins 46 can move out of the track 48, and moved back in, through an opening 26. Note that releasing the pins outward bias with the handle 50 does not provide sufficient clearance for the pins 46 to pull free of the guide track 48. The pins 46, and thereby the lift gate may only be freed from the guide track 48 through the opening 26. In the fully open position the lower section 34 of the lift gate 30 is partially folded relative to the upper section 32 of the lift gate 30 such that the full length of the lift gate 30 does not extend rearward from the vehicle 10.

A windowpane 52 is disposed within an opening 54 in the upper section 32 of the lift gate 30. The window 52 is movable between open and closed positions by sliding downward into the lower section 34 of the lift gate 30 when the lift gate 30 is in the closed position. The windowpane 52 moves within guide channels 56 disposed within the upper and lower sections 32,34 of the lift gate 30. The guide channels 56 are flexible to pivot at the pivotal connection 40 between the upper and lower sections 32,34 of the lift gate 30. A motor 58 is attached to drive the windowpane 52 between open and closed positions. Preferably the motor 58 drives the windowpane 52 through a flexible drive cable 60. The drive cable 60 extends upward through the lower section 34 into the upper section 32 and to the windowpane 52. The drive cable 60 is flexible to accommodate the pivotal opening movement of the lift gate 30. As shown, the cable 60 can bend around the pivot 40. Again, the connection of the cable and its drive are with the skill of a worker in this art. It should be understood that it is within the contemplation of this invention to use other mechanisms for raising and lowering the windowpane within the lift gate 30.

Figure 2A:
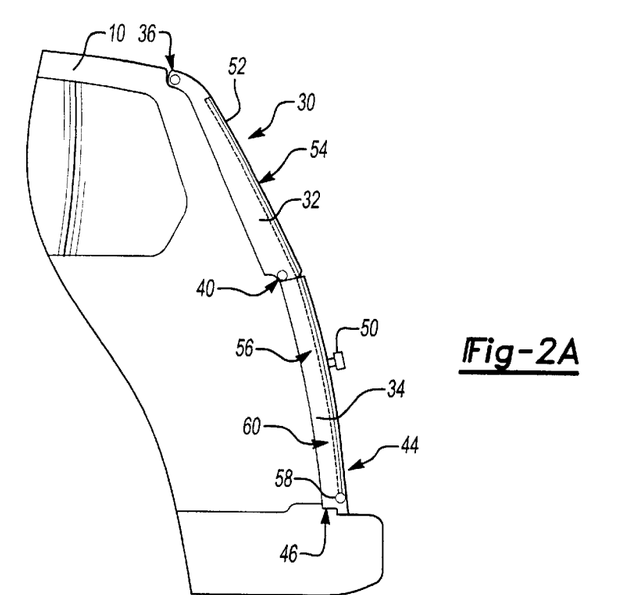
FIGS. 2A–D are side views of a folding lift gate in various open positions.
Figure 2B:
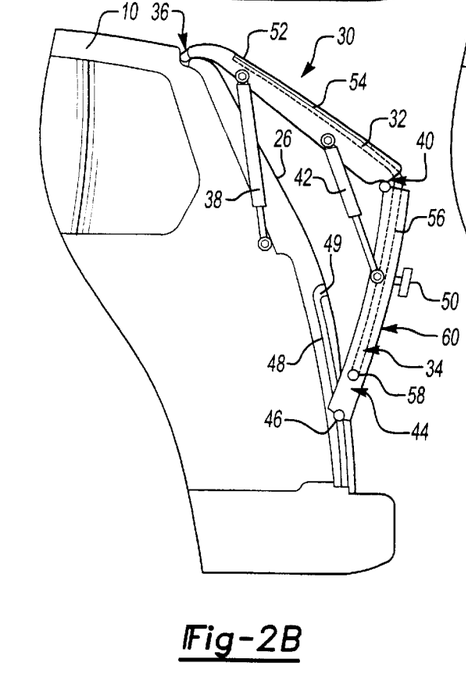
Figure 2C:
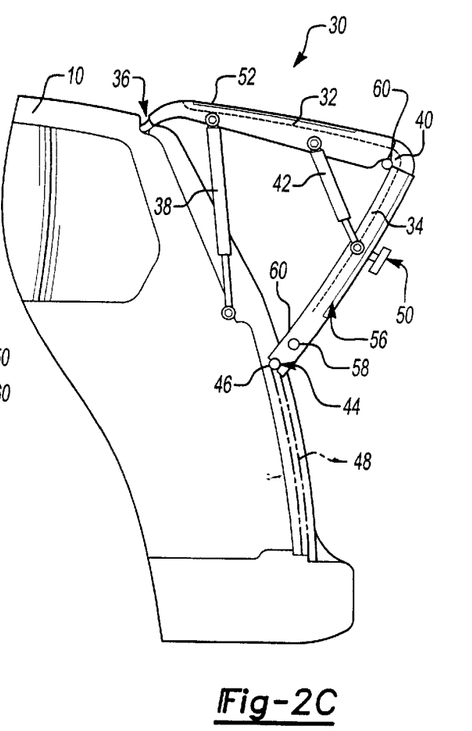
Figure 2D:
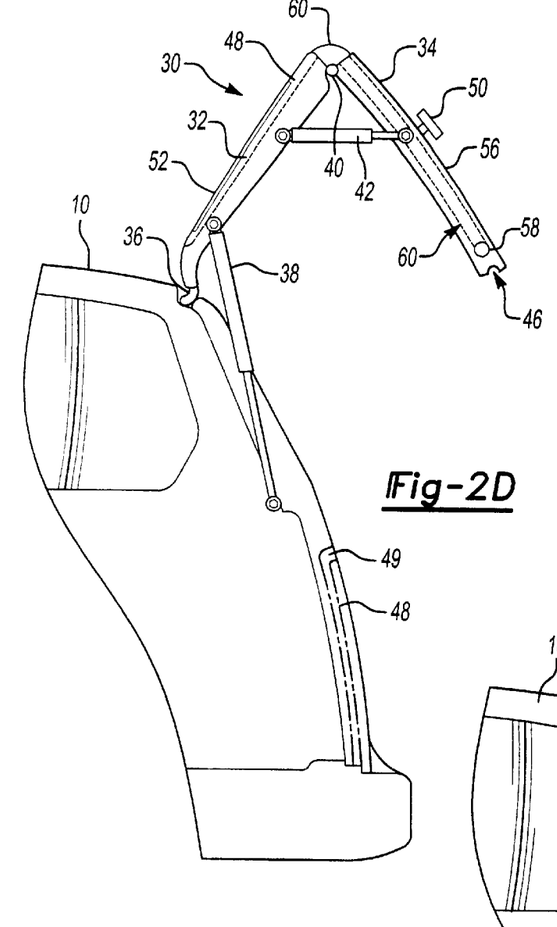
Figure 3A:
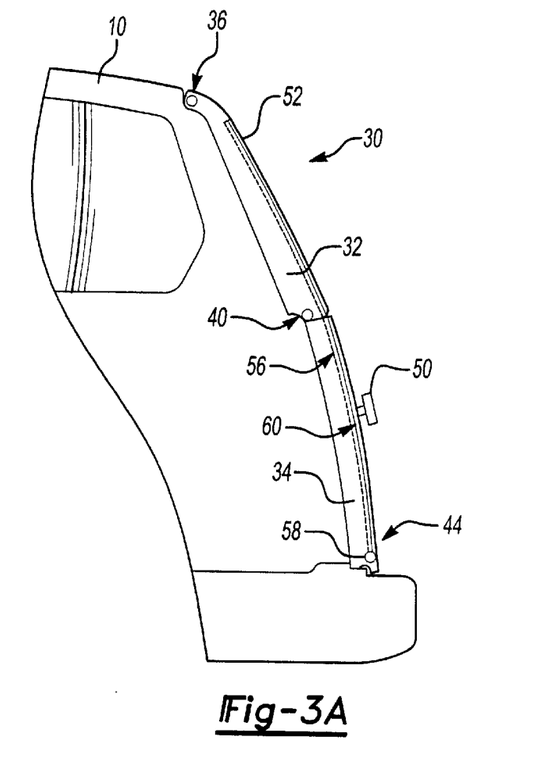
FIGS. 3A–D are side views of another embodiment of the folding lift gate shown in various open positions.
Figures 3B, 3C, 3D:
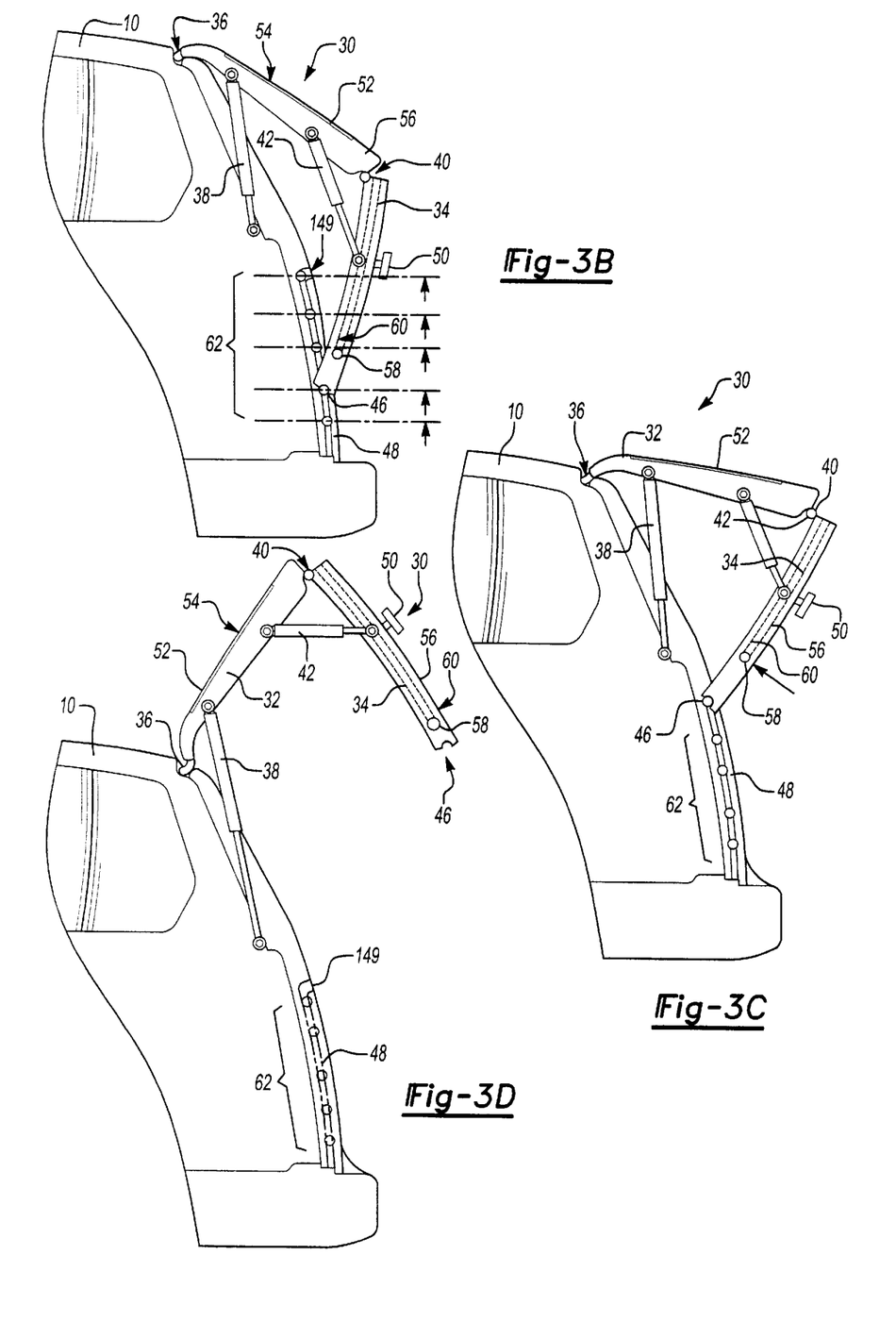

Beginning with the windowpane 52 in the fully closed position as shown in FIG. 2A, the motor is activated and the windowpane 52 pivots inward within the guide track 48 in a motion similar to that of a moon roof. The windowpane 52 is guided through the guide channel 56 into the lower section 34. The guide channel 56 may be flexible to accommodate pivoting of the lower section 34 relative to the upper section or may be in separate sections that align to form a continuous guide channel when the lift gate 30 is in the closed position. Because of the pivotal opening configuration of the lift gate 30 the windowpane 52 must either be in the fully open or fully closed position to open the lift gate 30.

Twisting handle 50 engages the retaining mechanism 44 and releases the pins 46 such that the lower section 34 may be moved within the guide track 48 to open the lift gate 30. Concurrently pulling upward and outward on the handle 50 causes the lower section 34 of the lift gate 30 to pivot outwardly about pins 46 and the pivotal connection 40. The upper section 32 pivots about pivotal connection 36 because of the outward movement of the pivotal connection 40. Releasing the handle 50 at any intermediate open position reengages the pins 46 with the guide track 48 to maintain that position. The strut assemblies 38 and 42 assist in opening of the lift gate 30 by accommodating the weight of the upper and lower sections 32,34, such that an operator applies only enough effort to move the lift gate 30, and is not required to exert sufficient effort to support the lift gate 30. Further upward and outward movement of the handle 50 pulls the pins 46 further upward within the guide track 48 to reach the opening 26. The pins 46 exit the guide track 48 through the opening to free the lift gate 30 from the constraint of the guide track 48 such that the lift gate may be raised to the fully open position shown in FIG. 2D.

Referring to FIGS. 3A–D, in another embodiment of the lift gate 30, the guide track 48 includes a plurality of openings 62 through which the pins 46 extend to maintain the lift gate 30 in a plurality of partially open positions. The retaining mechanism 44 biases the pins outwardly to extend through the openings 62 of the guide track 48. Movement of the lift gate 30 is accomplished by rotating the handle 50 to release the pins 46 from the openings. Once the desired open position is set the handle 50 is released and the pins 46 extent into the opening 62 corresponding to the desired lift gate 30 position.

The embodiment shown in FIGS. 3A–D operates much like the lift gate embodiment shown in FIGS. 2A–D. The windowpane 52 operates as described above in embodiment shown in FIGS. 2A–D. The difference is the addition of the openings 62. Again as in the embodiment of FIGS. 2A–D the handle 50 is rotated to release the pins 46 from the outward bias into the guide track 48, such that pulling outward and upward on the handle 50 may raise the lift gate 30. Releasing the handle 50 returns the outward bias of the pins 46 such that the pins 46 extend through one of the openings 62 to positively maintain the intermediate open position. In this way the intermediate open position is maintained not only by the strut assemblies 38,42 but also by the pins 46. Another twist of the handle 50 will release the pins 46 from the intermediate opening to allow further upward movement of the lift gate 30 within the guide track 48. Further upward movement allows the pins 46 to exit the guide track 48 through the opening 26, such that the lift gate 30 may be fully opened.

Figure 4A:
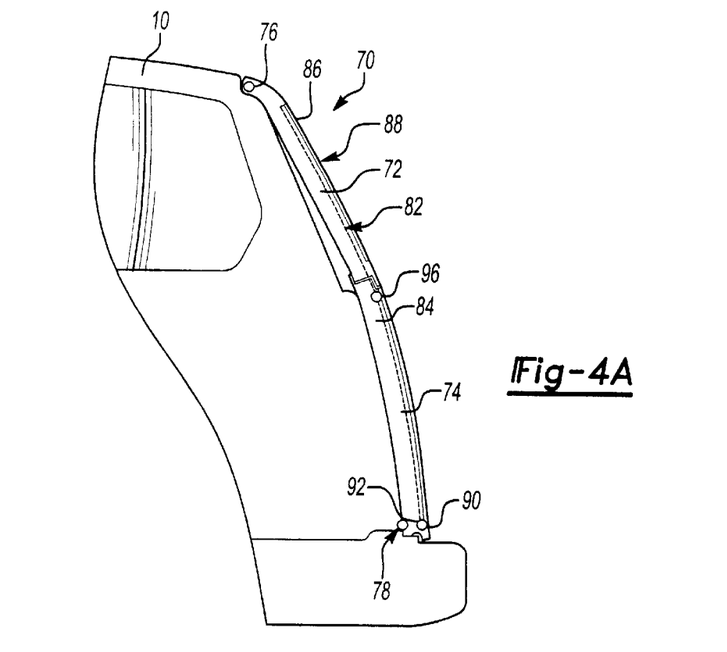
FIGS. 4A–B are side views of a split lift gate shown in open and closed positions.
Figure 4B:
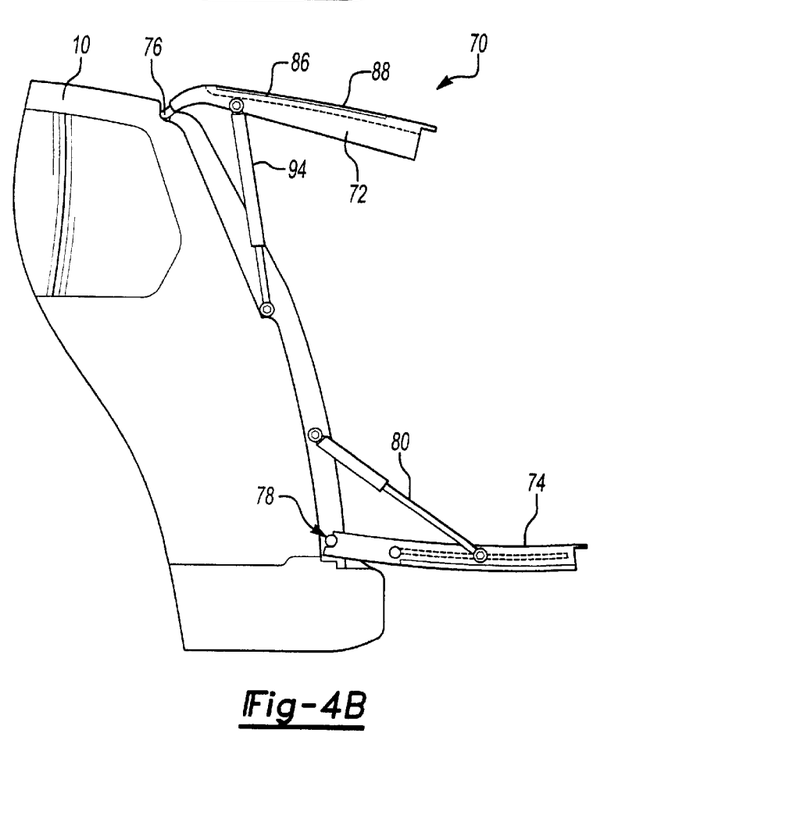

Referring to FIGS. 4A–B, another embodiment of a lift gate is disclosed. The lift gate 70 includes upper and lower sections 72,74 pivotally attached to the vehicle 10. The upper section 72 includes a first pivotal connection 76 at a topmost part to the vehicle 10 such that the upper section 72 rotates upwardly to an open position. The lower section 74 includes a second pivotal connection 78 to the vehicle 10 such that the lower section 72 rotates downwardly to an open position. A cable 80 attached to the lower section 72 limits the amount that the lower section 72 may be opened to prevent contact and damage to the vehicle 10. The upper section includes an opening 88 and a windowpane 86 disposed within that opening 88. The upper and lower sections 72,74 of the lift gate 70 include upper and lower guide channels 82,84 that align with one another when the lift gate sections 72,74 are in the closed position. The upper and lower guide channels 82, 84 are distinct and separate channels that mate to one another to form a continuous channel for the windowpane 52 when the lift gate 70 is in the closed position.

Figure 5A:
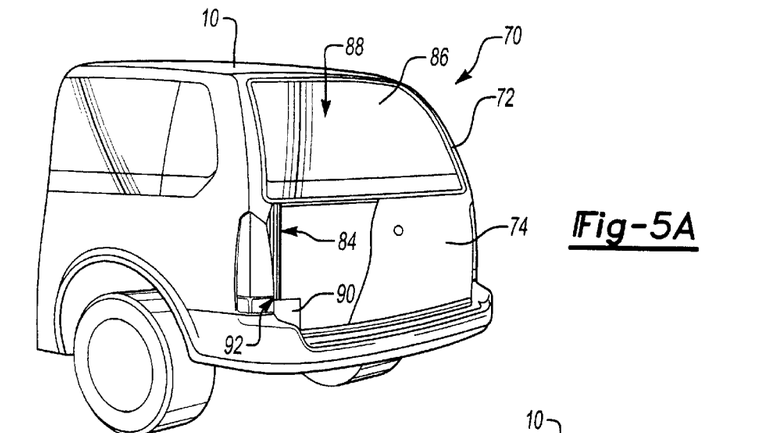
FIGS. 5A–C are perspective views of the split lift gate in the closed positions and having the windowpane in various positions.
Figure 5B:
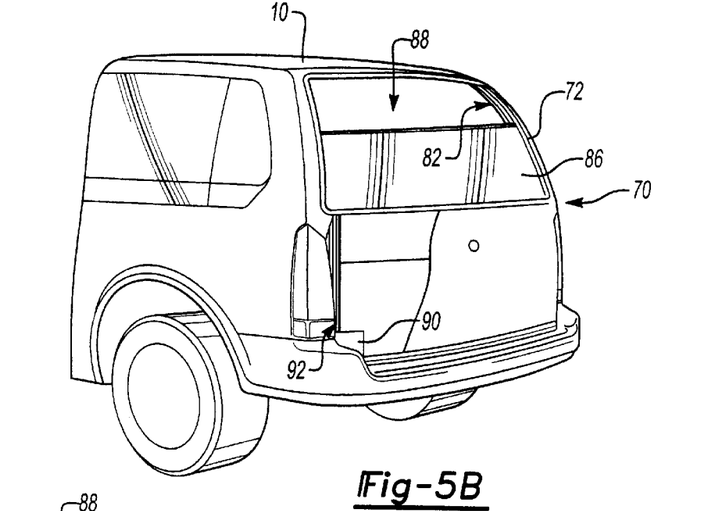
Figure 5C:
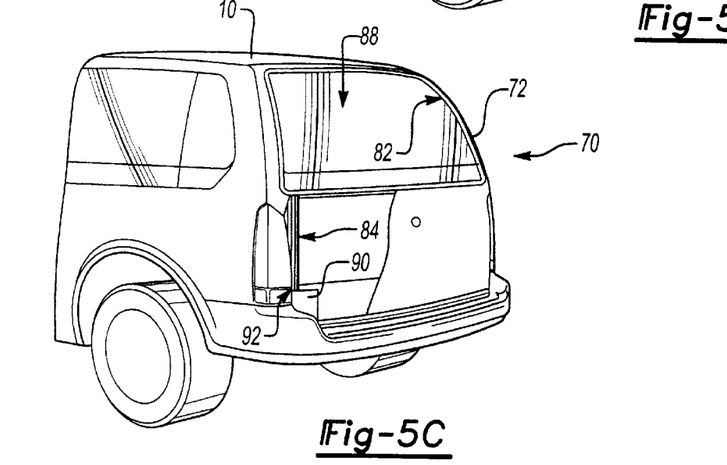

Referring to FIGS. 5A–C, the embodiment of FIGS. 4A–C is shown with the windowpane 86 at different positions. The windowpane 86 slides within the guide channels 82,84 between closed and open positions. The windowpane 86 is driven between open and closed positions by a motor 90. The motor 90 drives a mechanism that is completely contained in the lower section 74 of the lift gate 70. Preferably, the upper section 72 of the lift gate may only be opened after the windowpane 86 is lowered into the lower section 74 because of the way in which the lift gate sections 72,74 pivot open. An appropriate lock control 96 will block opening of the sections 72,74 if the window is still in the upper section. An acceptable lock (mechanical pin, magnetic, etc.) may be used.

Further, because the upper and lower sections 72, 74 pivot in different directions, the mechanism for driving the windowpane 86 upward into the upper section must be completely contained within the lower section 74 such that only the windowpane 86 extends upward into the upper section 72. The windowpane 86 opens by being driven downward into the lower section. Preferably, a flexible drive cable 92 is driven by the motor 90 to move the windowpane 86 between open and closed positions. It should be understood that any mechanism for raising and lower the windowpane 86 known to one skilled in the art is within the contemplation of this invention.

The foregoing description is exemplary and not just a material specification. The invention has been described in an illustrative manner, and should be understood that the terminology used is intended to be in the nature of words of description rather than of limitation. Many modifications and variations of the present invention are possible in light of the above teachings. The preferred embodiments of this invention have been disclosed, however, one of ordinary skill in the art would recognize that certain modifications are within the scope of this invention. It is understood that within the scope of the appended claims, the invention may be practiced otherwise than as specifically described. For that reason the following claims should be studied to determine the true scope and content of this invention.

What is claimed is:

1. A lift gate assembly for a vehicle comprising:
    a lift gate having upper and lower sections each pivotally attached to move between open and closed positions;
    a windowpane disposed within said upper section and slidable into said lower section to provide an opening into said vehicle.

2. The assembly of claim 1, wherein said pivotal attachment of said upper section is positioned at a top most part of the vehicle such that said lift gate opens upwardly.

3. The lift gate assembly of claim 1, further including a track assembly disposed within said upper and lower sections and said windowpane guides within said track assembly between said open and closed positions.

4. The lift gate assembly of claim 1, wherein said lift gate includes a seal assembly outlining said opening to seal between said windowpane and said lift gate.

5. The lift gate assembly of claim 4, wherein said lift gate further includes a drive mechanism for moving said window pane between said open and closed positions.

6. The lift gate assembly of claim 5, wherein said drive mechanism includes a pivotal connection to pivot said windowpane against said seal assembly when said windowpane is in said closed position.

7. The lift gate assembly of claim 6, wherein said pivotal connection of said drive mechanism pivots said windowpane inwardly within said track assembly into said upper section and downwardly to be received within said lower section of said lift gate.

8. A lift gate assembly for a vehicle comprising;
    a lift gate including an upper and lower section, said upper section pivotally attached to the vehicle and said lower section pivotally attached to said upper section such that said lower section may pivot relative to said upper section;
    a windowpane disposed in said upper section and movable into said lower section; and
    a retaining mechanism disposed within said lower section of said lift gate to hold said lift gate in a plurality of intermediate open positions.

9. The assembly of claim 8, further including a track disposed on opposite sides of said lift gate, and said retaining mechanism includes pins projecting from opposing sides of said lower section that engage said track.

10. The assembly of claim 9, wherein said track includes a plurality of openings through which said pins extend to hold said lift gate in one of said plurality of intermediate open positions.

11. The assembly of claim 9, further including an opening through which said pins exit and enter said track.

12. The assembly of claim 9, wherein said retaining mechanism is actuated by a handle to release said pins from said track such that said lift gate can be moved along said track.

13. The assembly of claim 8, further including a first strut pivotally connected to said upper section at one end and to the vehicle at a second end.

14. The assembly of claim 13, further including a second strut pivotally attached to said upper section at one end and to said lower section at a second end such that said lower section maintains a position relative to the upper section.

15. A lift gate assembly for a vehicle comprising;
a lift gate having an upper section and a lower section, said upper section including an opening and pivotally attached to open upward and said lower section pivotally attached to open downward;
a windowpane slidable between said upper and lower sections;
said windowpane slidable into said lower section in said closed position.

16. The assembly of claim 15, further including upper and lower guide channels disposed within said upper and lower sections; said upper and lower guide channels are aligned when said upper and lower sections are in said closed position such that said window pane is guided between said upper and lower portions of said lift gate.

17. The assembly of claim 15, further including a drive mechanism for moving said windowpane between said open and closed positions, such that in said closed position, said windowpane is retracted into said lower section of said lift gate.

18. The assembly of claim 15, wherein a strut is attached to support said upper section when in said open position.

* * * * *